(12) United States Patent
Elbibary et al.

(10) Patent No.: US 12,320,445 B2
(45) Date of Patent: Jun. 3, 2025

(54) SYSTEM, METHOD, AND VALVE ASSEMBLY FOR SURGE PROTECTION

(71) Applicant: THE BOEING COMPANY, Arlington, VA (US)

(72) Inventors: Mohamed Elbibary, Everett, WA (US); Hosam E. El-Gabalawy, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 375 days.

(21) Appl. No.: 18/161,202

(22) Filed: Jan. 30, 2023

(65) Prior Publication Data

US 2024/0255070 A1     Aug. 1, 2024

(51) Int. Cl.
*F16K 37/00* (2006.01)
*G01L 23/00* (2006.01)
(Continued)

(52) U.S. Cl.
CPC .......... *F16K 37/0066* (2013.01); *G01L 23/00* (2013.01); *G05D 7/0676* (2013.01); *B64D 13/02* (2013.01); *F04D 27/001* (2013.01); *F04D 27/02* (2013.01); *F04D 27/0246* (2013.01); *F04D 27/0253* (2013.01); *F04D 27/0261* (2013.01);
(Continued)

(58) Field of Classification Search
CPC ... F16K 37/0066; F16K 15/038; G01L 23/00; G05D 7/0676; B64D 13/02; F05D 2270/101; F05D 2270/3013; F04D 27/0253; F04D 27/0292; F04D 27/02; F04D 27/001; F04D 27/0246; F04D 27/0261

USPC ....... 137/10, 487.5, 511, 557; 415/1, 26, 11, 415/28; 251/304, 305
See application file for complete search history.

(56) References Cited

U.S. PATENT DOCUMENTS 3,105,513 A    10/1963   Ray
3,901,620 A     8/1975   Boyce
(Continued)

FOREIGN PATENT DOCUMENTS

GB    628354 A     8/1949
WO    9634207 A1   10/1996

OTHER PUBLICATIONS

Extended European Search Report mailed Apr. 22, 2024 for corresponding EP Patent Application No. 23211428.0 (7 pages).

*Primary Examiner* — Minh Q Le
(74) *Attorney, Agent, or Firm* — Philip S. Hof; The Small Patent Law Group LLC

(57) ABSTRACT

A surge control system and method include a valve assembly located along a fluid conduit downstream of one or more compressors in a flow circuit, and configured to receive a fluid stream from the one or more compressors. The valve assembly includes a valve body, a pitot tube integrated onto the valve body, and a pressure sensor device operably connected to the pitot tube. A controller of the surge control system receives pressure measurements generated by the pressure sensor device. The pressure measurements represent pressure in the pitot tube over time. The controller analyzes at least one of (i) the pressure measurements or (ii) flow velocity values derived from the pressure measurements, and detects a surge condition in the flow circuit based on oscillations in the at least one of the pressure measurements or the flow velocity values.

20 Claims, 5 Drawing Sheets

(51) Int. Cl.
*G05D 7/06* (2006.01)
*B64D 13/02* (2006.01)
*F04D 27/00* (2006.01)
*F04D 27/02* (2006.01)
*F16K 15/03* (2006.01)

(52) U.S. Cl.
CPC .... *F04D 27/0292* (2013.01); *F05D 2270/101* (2013.01); *F05D 2270/3013* (2013.01); *F16K 15/038* (2013.01)

(56) References Cited

U.S. PATENT DOCUMENTS

| | | | | |
|---|---|---|---|---|
| 4,103,544 | A * | 8/1978 | Beckmann | H01H 35/242 340/963 |
| 4,598,734 | A * | 7/1986 | Moyes | A62C 37/50 137/557 |
| 5,056,555 | A * | 10/1991 | Frijlink | F16K 17/0493 137/557 |
| 6,149,130 | A * | 11/2000 | Thurston | F16K 1/22 251/173 |
| 6,648,010 | B1 * | 11/2003 | Goodwin | F16K 15/033 137/493.1 |
| 11,378,084 | B2 * | 7/2022 | Nohmi | F04D 29/668 |
| 2011/0177770 | A1 * | 7/2011 | Tanner | B64D 13/04 251/304 |
| 2014/0030058 | A1 * | 1/2014 | Mirsky | F04D 27/0261 415/26 |
| 2016/0053766 | A1 * | 2/2016 | Lee | F04D 27/0284 415/17 |
| 2016/0103012 | A1 * | 4/2016 | Liu | F01D 21/14 702/33 |
| 2017/0002820 | A1 * | 1/2017 | Benim | F04D 27/02 |
| 2017/0167620 | A1 * | 6/2017 | Minta | F16K 15/038 |
| 2018/0135637 | A1 * | 5/2018 | Narayanan | F04D 27/0223 |
| 2021/0293340 | A1 * | 9/2021 | Allen | F16K 15/038 |
| 2022/0196024 | A1 * | 6/2022 | Perevozchikov | F04D 25/06 |
| 2022/0196025 | A1 * | 6/2022 | Perevozchikov | F04D 27/0292 |
| 2022/0274716 | A1 * | 9/2022 | Ormieres | B64D 41/00 |

\* cited by examiner

SYSTEM, METHOD, AND VALVE ASSEMBLY FOR SURGE PROTECTION

FIELD OF THE DISCLOSURE

Embodiments of the present disclosure generally relate to fluid flow circuits, which may be located in aircraft.

BACKGROUND OF THE DISCLOSURE

Surge in a closed fluid flow circuit occurs when resonance in the fluid flow causes pressure waves that negate steady state flow. For example, a compressor may become aerodynamically unloaded, which causes fluctuations in the flow. During a deep surge condition, the fluid flow direction may reverse. Surge is undesired as it fails to provide consistent fluid to loads that use the fluid. Another downside is that the pressure waves may degrade and/or damage the compressors and/or other components of the fluid flow circuit. For example, once a surge cycle is formed, it may alternate between propagating in the forward flow direction and the reverse flow direction. These continuous reciprocal surge cycles can cause strong vibrations that can damage machinery.

Existing surge detection systems may not reliably detect surges that occur and/or may have a delayed detection of surges which reduces the effectiveness of the response to correct the surge and reestablish steady state flow. Existing systems that monitor pressure oscillations may induce artificial oscillations in the fluid flow which can degrade the accuracy of the pressure sensor measurements. For example, artificial oscillations attributable to a curved tube of the existing systems may interfere with surge-induced oscillations, making the system prone to mis-detecting surges that occur. Furthermore, existing systems may not detect the surge condition until after the surge condition has developed and compressor unloading has occurred. This delay may decrease the likelihood of successfully reconfiguring the compressor to resume normal operation and avoid component damage.

SUMMARY OF THE DISCLOSURE

A need exists for a system and method to provide early and reliable detection of surge conditions in fluid flow circuits. With that need in mind, certain embodiments of the present disclosure provide a surge control system that includes a valve assembly and a controller including one or more processors. The valve assembly is located along a fluid conduit downstream of one or more compressors in a flow circuit, and is configured to receive a fluid stream from the one or more compressors. The valve assembly includes a valve body, a pitot tube integrated onto the valve body, and a pressure sensor device operably connected to the pitot tube. The controller is configured to receive pressure measurements generated by the pressure sensor device. The pressure measurements represent pressure in the pitot tube over time. The controller is configured to analyze at least one of (i) the pressure measurements or (ii) flow velocity values derived from the pressure measurements, and detect a surge condition in the flow circuit based on oscillations in the at least one of the pressure measurements or the flow velocity values.

Certain embodiments of the present disclosure provide a method for detecting surge conditions in a flow circuit. The method includes receiving pressure measurements generated by a pressure sensor device of a valve assembly within a flow circuit. The valve assembly includes a valve body and a pitot tube integrated onto the valve body. The valve body obstructs a flow path through a conduit. The pressure sensor device is operably connected to the pitot tube. The pressure measurements represent pressure in the pitot tube over time. The method includes analyzing, via a controller comprising one or more processors, at least one of (i) the pressure measurements or (ii) flow velocity values derived from the pressure measurements, and detecting a surge condition in the flow circuit based on oscillations in the at least one of the pressure measurements or the flow velocity values.

Certain embodiments of the present disclosure provide a valve assembly that includes a valve body, a pitot tube, and a pressure sensor device operably connected to the pitot tube. The valve body includes a front side and a back side opposite the front side. The valve body is configured to be installed in a fluid conduit such that the front side faces upstream and the back side faces downstream relative to a fluid flow direction. The pitot tube is coupled to the back side of the valve body. The pressure sensor device is configured to generate pressure measurements representing pressure in the pitot tube over time.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
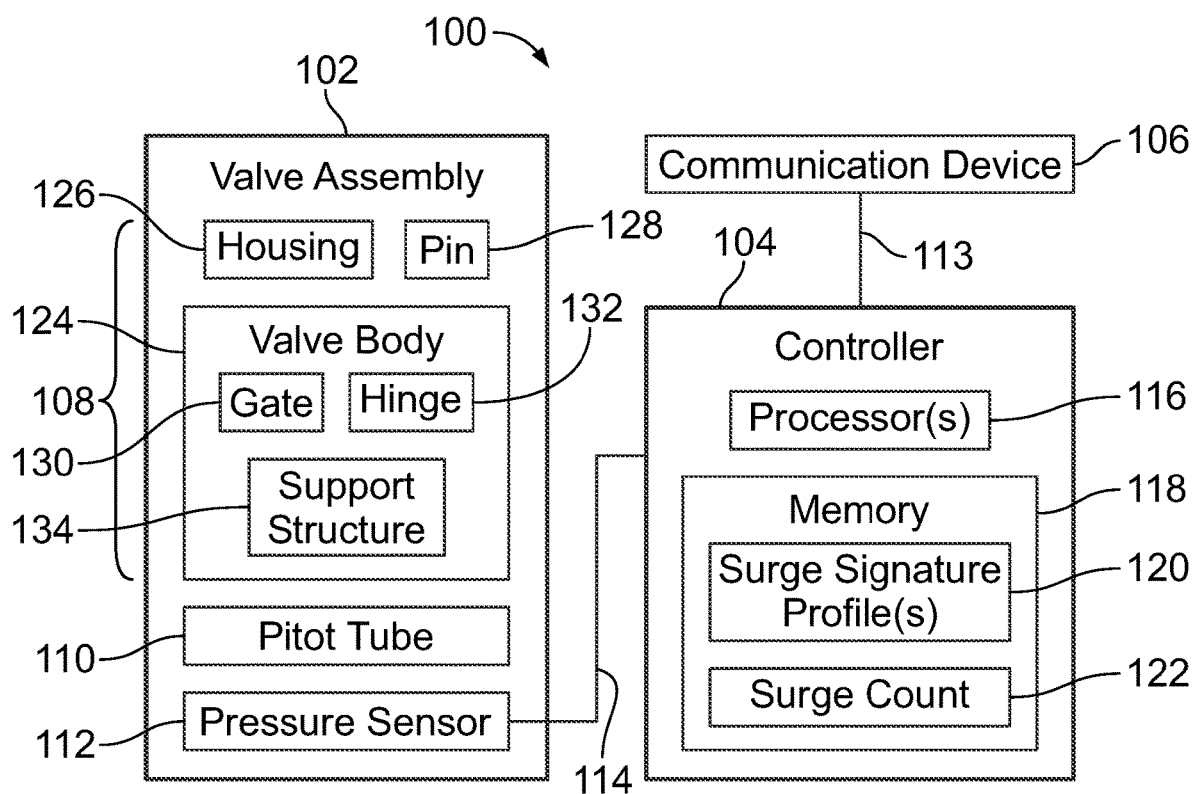
FIG. 1 is a block diagram showing a surge control system according to an embodiment.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure describe a surge control system that provides early, reliable surge detection in a fluid flow circuit. The fluid flow circuit may include one or more compressors that increase the pressure of the fluid in the flow circuit. The flow circuit may be a pneumatic system, such that the fluid is air or another gas. Alternatively, the flow circuit may be a hydraulic system, such that the fluid is a liquid. The flow circuit may be disposed onboard a vehicle. In an example, the vehicle may be an aircraft. In other examples, the flow circuit may be disposed onboard a rail vehicle, a bus, an automobile, a truck, a marine vessel, or another type of vehicle. The surge control system optionally may be used in non-vehicular applications, such as at industrial facilities.

The surge control system includes a specially-designed valve assembly within a conduit of the fluid flow circuit. The conduit that includes the valve assembly may be an outlet duct downstream of at least one compressor. The valve assembly includes a includes a pitot tube integrated on a valve body. The pitot tube is used to monitor pressure variations in the conduit. For example, pressure oscillations in the flow are received within the pitot tube. The pitot tube may be disposed along a back or downstream side of the valve, and the pressure oscillations in the pitot tube may be based on back pressure of the flow. The pressure waves may cause the valve to flutter, which may induce or enhance the pressure oscillations in the pitot tube. The oscillations in the pitot tube are sensed by a transducer of a pressure sensor device, which converts the flow to electrical signals corresponding to pressure in the pitot tube.

The surge control system includes a controller (e.g., an electrical control circuit) that receives and analyzes the pressure measurements from the sensor device over time to detect when a surge condition is present. The controller may also identify a particular type or mode of the surge condition. In response to detecting a surge condition, the controller may take one or more responsive actions, such as reconfiguring the compressor operations to return the fluid flow to steady state. In an example, the controller may reconfigure the compressor operations by increasing output flow in order to overcome the pressure forces that cause the surge condition.

At least one technical benefit of the surge control system according to the embodiments described herein is a quick response time, which may be attributable to direct sensing of surge. The valve assembly may be within a main flow stream of the fluid flow circuit, to provide the direct sensing. Another technical benefit may be to avoid unscheduled maintenance and extend the operational lifetimes of the components in the fluid flow circuit. For example, quickly identifying and responding to surge conditions can reduce component damage and degradation caused by vibration and non-steady fluid flow. The information provided by the surge control system may be more detailed and/or accurate than existing systems, which can allow for tailoring the responsive control operations based on the specific condition. For example, the surge control system may identify the type or mode of the surge condition and/or which compressor of multiple compressors is associated with the surge condition. The information generated by the surge control system may enable anticipating when a component may need maintenance (e.g., repair or replacement) and scheduling such maintenance to occur during a normal scheduled maintenance event before the component fails, which avoids unscheduled maintenance. Optionally, the surge control system may reduce the number of discrete components in the fluid flow circuit. For example, the surge control system may eliminate one or more pressure sensors that would be used in the fluid flow circuit.

FIG. 1 is a block diagram showing a surge control system 100 according to an embodiment. The surge control system 100 may be incorporated into a fluid flow circuit. The surge control system 100 includes a valve assembly 102 and a controller 104. The valve assembly 102 may be installed within a conduit of the fluid flow circuit. The valve assembly 102 includes a valve 108, a pitot tube 110, and a pressure sensor device 112. The valve 108 may control fluid flow through the conduit. The pressure sensor device 112 is operably connected to the pitot tube 110. For example, the pressure sensor device 112 may include a transducer that is integrated on the pitot tube 110, within an interior channel of the pitot tube 110, or fluidly connected to an end of the pitot tube 110. The surge control system 100 may also include a communication device 106.

The controller 104 may be operably connected to the communication device 106 and the pressure sensor device 112 via wired and/or wireless communication links 113, 114 to permit the transmission of information in the form of signals. For example, the controller 104 may receive sensor signals generated by the pressure sensor device 112 via the communication link 114. These sensor signals are pressure measurements. The pressure measurements represent pressure in the pitot tube 110 over time. The controller 104 may generate control signals that are transmitted to the communication device 106 via the communication link 113 to control operation of the communication device 106. For example, the controller 104 may generate alert messages that are remotely communicated (e.g., transmitted or broadcast) by the communication device 106. In an example, an alert message may be transmitted by the communication device 106 to a user to notify the user about a detected surge condition. In another example, the controller 104 may control the communication device 106 to communicate with a maintenance facility or personnel for scheduling maintenance of a compressor or other components of the fluid flow circuit. The communication device 106 may receive messages from remote sources and forward to the controller 104 via the communication link 113. The surge control system 100 may have additional components that are not shown in FIG. 1, such as a user input/output device. In an alternative embodiment, the surge control system 100 may lack one or more of the components shown in FIG. 1, such as the communication device 106.

The controller 104 represents hardware circuitry that includes and/or is connected with one or more processors 116 (e.g., one or more microprocessors, integrated circuits, microcontrollers, field-programmable gate arrays, etc.). The controller 104 includes and/or is connected with a tangible and non-transitory, computer-readable memory storage device (e.g., data storage medium or device), referred to herein as memory 118. The memory 118 may store programmed instructions (e.g., software) that are executed by the one or more processors 116 to perform the surge detection and response operations described herein. The programmed instructions may include one or more algorithms stored in the memory 118 and utilized by the one or more processors 116. References herein to the controller 104 may refer to the one or more processors 116.

The memory 118 may store information utilized by the one or more processors 116 to determine whether a flow circuit is experiencing a surge condition. In an example, the memory 118 stores one or more surge signature profiles 120. The surge signature profiles 120 may be reference templates depicting a measured or derived property or characteristic overtime during a confirmed surge condition. The surge signature profiles 120 can be used by the controller 104, for comparison purposes, in order to detect a surge condition in the flow circuit, as described in more detail herein. The memory 118 may store a surge count 122. The surge count 122 may represent a running tally of detected surge conditions in a given period of time. The controller 104 may increase the surge count 122 by one value each time a new surge condition is detected. The controller 104 may use the surge count 122 to plan scheduled maintenance for one or more components of the flow circuit. For example, the controller 104 may schedule maintenance for a compressor of the flow circuit once the compressor has experienced at least a designated threshold number of surge conditions. The memory 118 optionally may store additional information, such as various application program interfaces (APIs) that link to cloud hosting services, via the communication device 106, for accessing information from remote storage devices, such as servers.

The communication device 106 represents hardware circuitry that can communicate electrical signals. For example, the communication device 106 can represent transceiving circuitry, one or more antennas, and the like. The transceiving circuitry may include a transceiver or a separate transmitter and receiver. The electrical signals can form data packets that, in the aggregate, represent messages. In an example, the communication device 106 may wirelessly communicate electrical signals as radio frequency (RF) signals. In another example, the communication device 106 may be a modem, router, or the like, that is connected to a network (e.g., the Internet).

The valve 108 of the valve assembly 102 may include a valve body 124, a housing 126, and a pin 128. The valve body 124 may be coupled to the housing 126 via the pin 128. The housing 126 may be connected to the conduit. In an example, the housing is disposed at a joint between two tube members that define the conduit. In another example, the housing may be mounted within an interior of a single conduit member. The valve body 124 may extend into the flow path of the conduit to control fluid flow through the conduit. The valve body 124 may rotate about the pin 128. Although a single pin 128 is shown in FIG. 1, the valve body 124 may be coupled to the housing 126 via multiple pins or other types of fasteners.

In an embodiment, the valve 108 of the valve assembly 102 is a one-way or check valve that is designed to permit fluid flow across (e.g., through) the valve 108 in only one direction (referred to herein as a downstream direction). In an embodiment, the valve 108 may be actuated by a pressure difference across the valve 108. For example, the valve body 124, as a portion of the check valve, may pivot to an open position to permit flow in the downstream direction if the upstream pressure is greater than the back pressure downstream of the valve 108. The valve body 124 may pivot to a closed position to block fluid flow across (e.g., through) the valve 108 if the back pressure is at least as great as the upstream pressure. Optionally, the valve 108 may include a biasing member that exerts a biasing force urging the valve body 124 toward the closed position. The valve assembly 102 may include a different type of valve, other than a check valve, in an alternative embodiment.

In an embodiment, the valve body 124 may include a gate 130, a hinge 132, and a support structure 134. The gate 130 is the large portion of the valve body 124 that interfaces with the fluid. In an embodiment, the gate 130 is disc-shaped. The hinge 132 is a portion of the valve body 124 that receives and contains the pin 128. The hinge 132 enables the gate 130 to rotate about the pin 128. The support structure 134 of the valve body 124 may hold the pitot tube 110 in a fixed position relative to the valve body 124. Optionally, the gate 130, hinge 132, and support structure 134 may be integrally formed during a single manufacturing process (e.g., molding, additive manufacturing, or the like), such that the valve body 124 is a unitary, monolithic (i.e., one-piece) component. For example, there may be no seams between the gate 130, the hinge 132, and the support structure 134 because the components are formed together as one. In an alternative embodiment, at least one of the gate 130, the hinge 132, and the support structure 134 may be a discrete component that is assembled onto the valve body 124.

Figure 2:
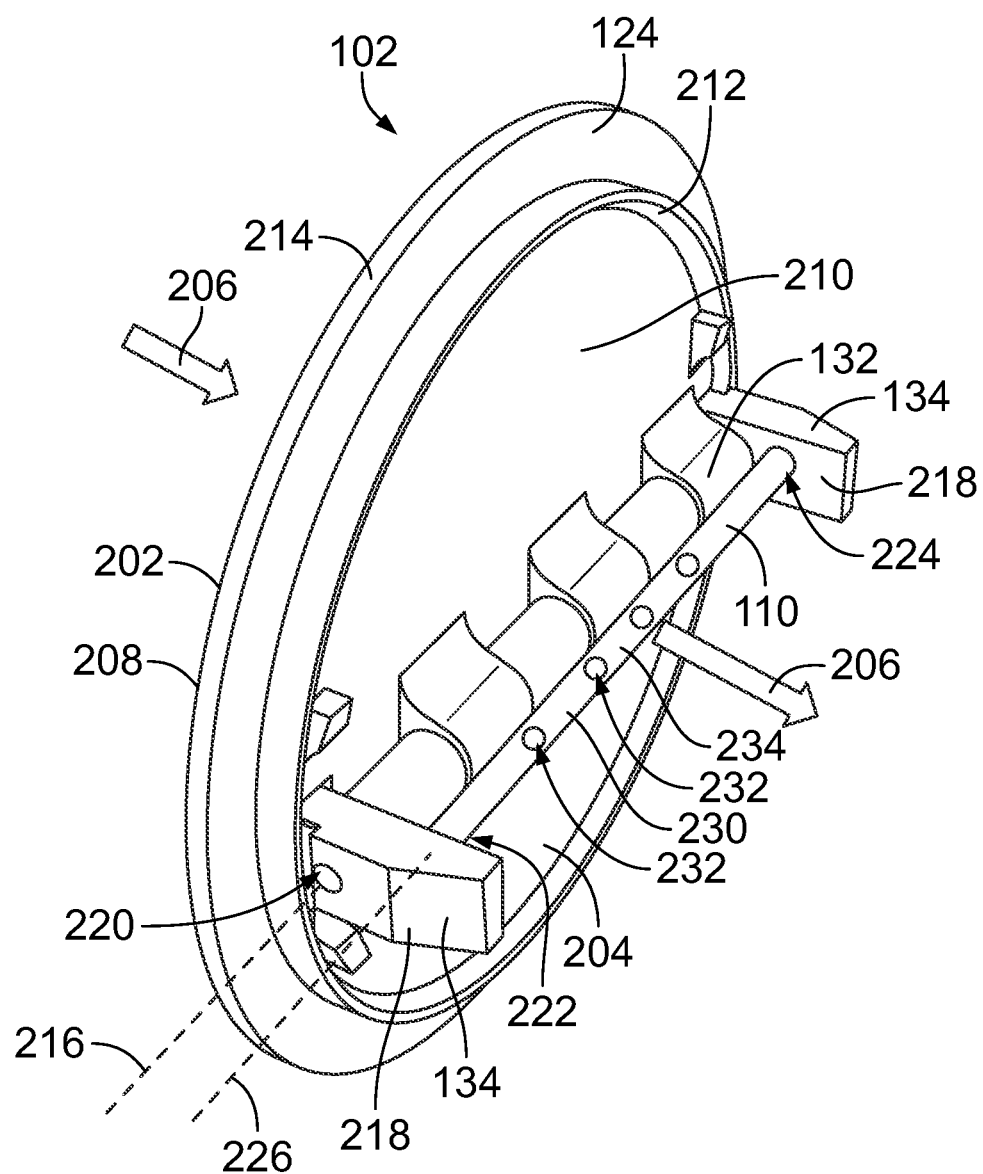
FIG. 2 is a perspective view of a valve assembly of the surge control system according to an embodiment.

FIG. 2 is a perspective view of the valve assembly 102 of the surge control system 100 according to an embodiment. The valve body 124 and the pitot tube 110 of the valve assembly 102 are visible in FIG. 2. The valve body 124 includes a front side 202 and a back side 204 that is opposite the front side 202. The valve body 124 is oriented, when assembled on the housing 126 (shown in FIG. 1) along the fluid conduit, such that the front side 202 faces upstream along the conduit relative to the downstream fluid flow direction 206. The back side 204 faces downstream along the conduit. When installed downstream of at least one compressor, the front side 202 may face upstream generally toward the at least one compressor, and the back side 204 may face downstream generally toward a load that receives compressed fluid from the at least one compressor.

The pitot tube 110 is integrated onto the valve body 124. For example, the pitot tube 110 may be secured in a fixed position to the valve body 124. As such, the pitot tube 110 may move with the valve body 124 relative to the housing 126. In an embodiment, the pitot tube 110 is coupled to the back side 204 of the valve body 124. The pitot tube 110 may be used to monitor the pressure along the back side 204 of the valve body 124, referred to as the back pressure. The pressure sensor device 112 (shown in FIG. 1) may have a transducer that is fluidly connected to one or more interior channels of the pitot tube 110. The transducer converts pressure waves to electrical signals, and the electrical signals are transmitted to the controller 104 (shown in FIG. 1) as pressure measurements.

The gate 130 (shown in FIG. 1) is a relatively large, solid portion of the valve body 124 that blocks fluid flow through the conduit when the valve body 124 is in the closed position. The gate 130 may be sized and shaped to correspond to an inner diameter of the housing 126 and/or the fluid conduit. In an example, the gate 130 is disc-shaped. The gate 130 has a front surface 208 along the front side 202 and a back surface 210 along the back side 204. In an example, the front surface 208 and the back surface 210 are planar. The gate 130 may include a band or ridge 212 extending from the back surface 210. The band 212 may be proximate to an outer perimeter edge 214 of the gate 130. The band 212 may extend along a full perimeter of the gate 130. For example, the band 212 may surround the hinge 132, the pitot tube 110, and the support structure 134. The band 212 and/or the portion of the gate 130 outside of the band 212 may be designed to abut against a seat in the housing 126 to seal the conduit when the valve body 124 is in the closed position. In the illustrated embodiment, the band 212 is annular.

The hinge 132 may be disposed along the back side 204 of the valve body 124. In an example, portions of the hinge 132 extend from the back surface 210 of the gate 130. The hinge 132 extends linearly along a hinge axis 216. The hinge 132 is designed to receive the pin 128 (shown in FIG. 1) or another type of fastener to rotatably (e.g., pivotably) connect the valve body 124 to the housing 126. The support structure 134 may include two tabs 218 disposed along the back side 204 of the valve body 124. The two tabs 218 may project rearward from the back surface 210 of the gate 130. In an example, the tabs 218 bookend the hinge 132, defining respective first and second ends of the hinge 132 along the hinge axis 216. The tabs 218 may each define a thru-hole 220 that receives the pin 128.

In an embodiment, the pitot tube 110 is secured to the tabs 218 of the support structure 134. For example, the pitot tube 110 has a first end 222 coupled to one of the tabs 218, and a second end 224 coupled to the other tab 218, such that the pitot tube 110 extends between the two tabs 218. The pitot tube 110 may linearly extend between the two ends 222, 224 along a tube axis 226. In an example, the pitot tube 110 extends parallel to the hinge 132, such that the tube axis 226 is parallel to the hinge axis 216. The hinge 132 may be disposed between the pitot tube 110 and the back surface 210 of the gate 130. Optionally, the pitot tube 110 may be spaced apart from the hinge 132 such that the pitot tube 110 does not mechanically contact the hinge 132.

The pitot tube 110 may have a hollow body 230 that defines at least one interior channel through the body 230. The pitot tube 110 may include multiple sensing holes 232 through an outer surface 234 of the hollow body 230. The sensing holes 232 may be spaced apart along the length of the pitot tube 110 between the first and second ends 222, 224. The sensing holes 232 represent openings to the interior channel(s) within the hollow body 230. The transducer of the pressure sensor device 112 may be fluidly connected to the interior channel(s) to receive fluid pressure waves that enter the pitot tube 110 through the sensing holes 232.

Figure 3:
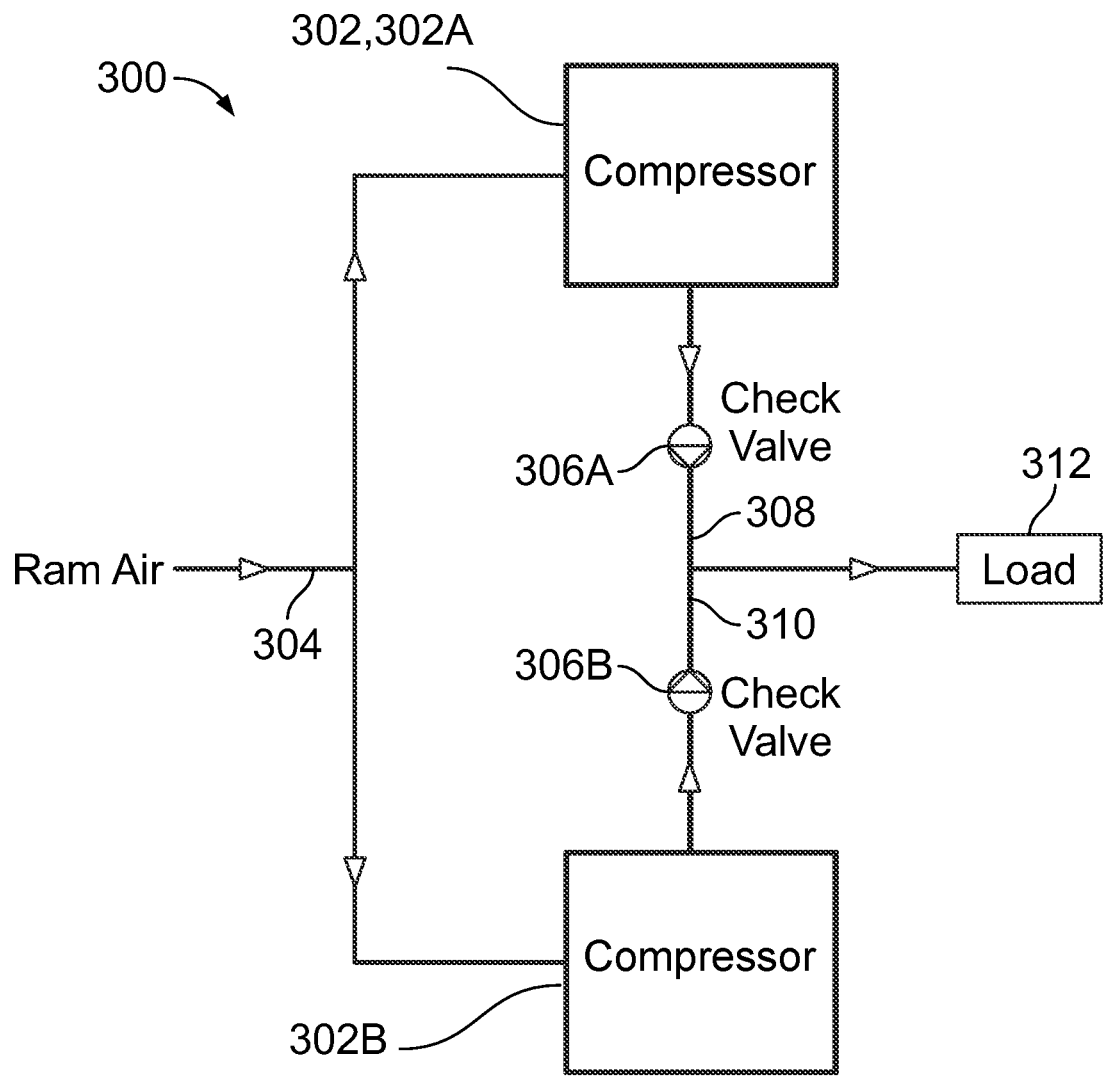
FIG. 3 is a diagram of a fluid flow circuit according to an embodiment.

FIG. 3 is a diagram of a fluid flow circuit 300 according to an embodiment. The fluid flow circuit 300 may include multiple compressors 302. In an example, the compressors 302 include a first compressor 302A and a second compressor 302B installed in parallel. In an example, the fluid flow circuit 300 may represent a cabin air compressor (CAC) system for a vehicle. In an example, the vehicle that includes the CAC system may be an aircraft. In the illustrated flow circuit 300, ram air is received into an inlet conduit 304, and the ram air stream is split into two streams directed to the two compressors 302A, 302B. The compressors 302A, 302B compress the respective air streams. The flow circuit 300 includes a first check valve 306A disposed along a first outlet duct 308 downstream of the first compressor 302A, and a second check valve 306B disposed along a second outlet duct 310 downstream of the second compressor 302B. The first check valve 306A receives a compressed fluid (e.g., air) stream from the first compressor 302A. The second check valve 306B receives a compressed fluid (e.g., air) stream from the second compressor 302B. The check valves 306A, 306B permit one-directional flow in the downstream direction from the respective compressor 302A, 302B to a load 312 that receives the compressed fluid. The check valves 306A, 306B located downstream of the compressors 302A, 302B are designed to prevent reversed flow from applying back pressure on the compressors 302A, 302B during normal, steady state flow conditions.

In an embodiment, each of the check valves 306A, 306B in the fluid flow circuit 300 is the valve assembly 102 shown in FIGS. 1 and 2. For example, each check valve 306A, 306B may have a respective valve body 124 with an integrated pitot tube 110 that is operably connected to a pressure sensor device 112. The controller 104 of the surge control system 100 may receive pressure measurements generated by each of the pressure sensor devices. For simplicity, the following description refers to operations of the controller 104 based on pressure measurements received from one pressure sensor device 112 of a valve assembly 102. For example, the following description may refer only to the valve assembly 102 that represents the first check valve 306A in FIG. 3, unless otherwise stated.

The controller 104 receives the pressure measurements generated by the pressure sensor device 112, which represent pressure in the pitot tube 110 over time. The controller 104 analyzes the pressure measurements to detect a surge condition, if present or developing. In an example, the controller 104 may analyze the pressure measurements, and may detect a surge condition in the flow circuit 300 based on oscillations in the values of the pressure measurements. The oscillations may be based on pressure waves received into the sensing holes 232 of the pitot tube 110.

In another example, the controller 104 may derive flow velocity values or another flow-related property of the fluid flow based on the pressure measurements received from the pressure sensor device 112. For example, the pressure measurement, generated based on the pressure in the pitot tube 110, may indicate the dynamic pressure of the fluid flow. Using the dynamic pressure, the controller 104 may derive a flow velocity value via Equation 1:

$$v = \sqrt{\frac{2P_d}{\rho}} \qquad \text{Eq. 1}$$

where v is flow velocity, $P_d$ is dynamic pressure, and ρ is the fluid density. In an example, the controller 104 may analyze the flow velocity values, and may detect a surge condition in the flow circuit 300 based on oscillations in the flow velocity values.

The controller 104 may analyze the pressure measurements and/or the flow velocity values by comparing the oscillations to the one or more surge signature profiles 120 (shown in FIG. 1) stored in the memory 118. The surge signature profiles 120 may provide a quantitative representation or graphical depiction of the pressure and/or flow velocity along the back side of a valve during confirmed surge conditions. The controller 104 may compare the oscillations in pressure and/or flow velocity to the surge signature profiles 120 to determine a level of match or correspondence between the field data (e.g., the oscillations based on the pressure measurements) and the reference data (e.g., the signature profiles). For example, the controller 104 may compare characteristics of the oscillations to corresponding characteristics in the surge signature profiles 120. The characteristics may include the amplitude of the oscillations, the period of the oscillations, how the oscillations change over time relative to one another, and the like. The controller 104 may assign a correspondence score that represents how well the characteristics of the oscillations match the characteristics of a given surge signature profile 120. If the correspondence score exceeds a designated correspondence threshold relative to one of the surge signature profiles 120, then the controller 104 may detect that a surge condition is present. The designated correspondence threshold may be an 80% match, a 90% match, a 95% match, or the like. The controller 104 detects a surge condition when a correspondence score exceeds the designated correspondence threshold for at least one of the surge signature profiles 120. The controller 104 determines that no surge condition is present when the correspondence scores are below the designated correspondence threshold for all of the surge signature profiles 120.

Optionally, the controller 104 may input the oscillations of the pressure measurements and/or the flow velocity values into an artificial neural network (ANN) algorithm that is trained to predict whether input data matches stored reference data in the form of the surge signature profiles 120. The ANN algorithm may be trained based on experimental data. The ANN algorithm may output the correspondence score that represents the level of match. The controller 104 compares the correspondence score to the designated correspondence threshold to detect whether surge is present.

In an embodiment, the controller 104 may identify additional information about a detected surge condition. The additional information may include a type or mode of the surge condition, a location or portion of the flow circuit 300 experiencing the surge condition, a severity of the surge condition, and/or the like. For example, based on the oscillations of the pressure measurements and/or the flow velocity values, the controller 104 may identify that the surge condition is a first mode surge condition or a second mode surge condition. The surge signature profiles 120 may include a first mode signature profile and a second mode signature profile. Upon detecting a surge condition, the controller 104 may identify that the surge condition is a first mode surge condition in response to the oscillations (e.g., the field data) matching the first mode signature profile more than the oscillations match the second mode signature profile. Stated differently, if a first correspondence score based on a comparison of the oscillations with the first mode signature profile is greater than a second correspondence score based on a comparison of the oscillations with the second mode signature profile, then the controller identifies the surge condition as the first mode. In an example, the surge modes include at least a mild mode and a deep mode, which may represent the first and second modes described above. The deep mode of surge is more severe than the mild mode and typically includes a reversal in the flow direction. The mild mode typically does not include flow reversal. A surge condition may change from the mild mode to the deep mode as the surge condition increases in severity. The controller 104 may be configured to identify more than two different modes in other embodiments, and/or at least one of the modes may be other than mild or deep.

Figure 4A:
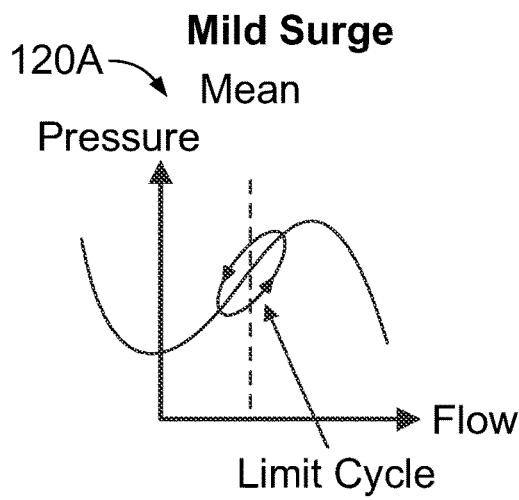
FIG. 4A depicts a first surge signature profile that represents pressure oscillations over time during a mild surge mode.
Figure 4B:
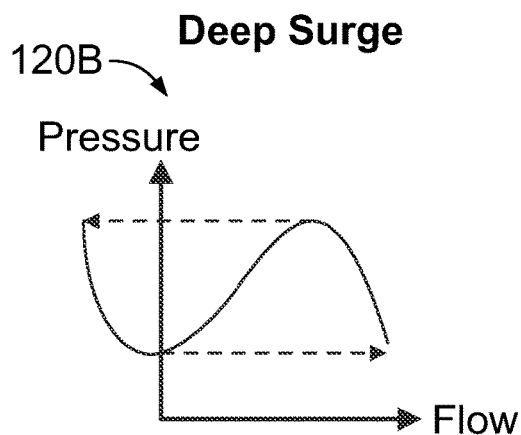
FIG. 4B depicts a second surge signature profile that represents pressure oscillations over time during a deep surge mode.
Figure 4C:
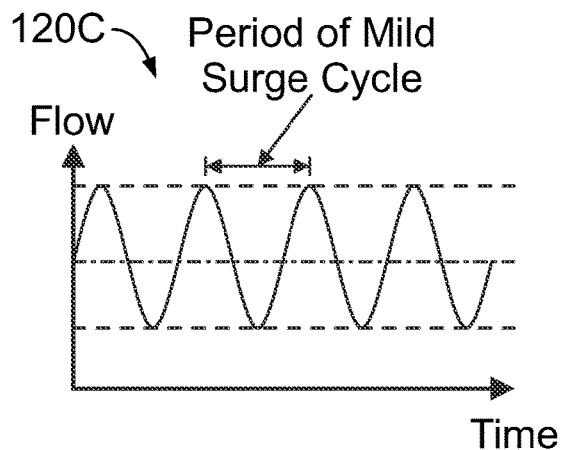
FIG. 4C depicts a third surge signature profile that represents flow velocity oscillations over time during the mild surge mode.
Figure 4D:
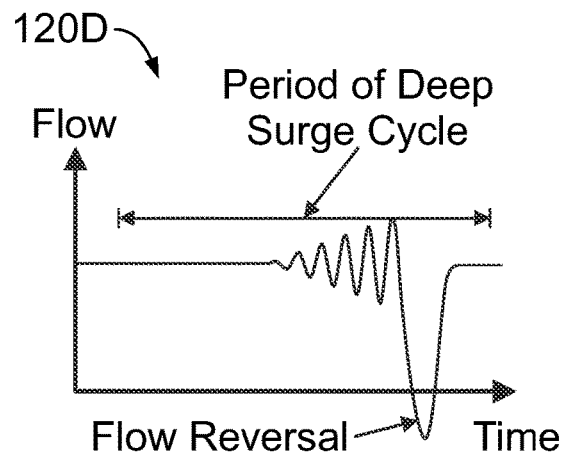
FIG. 4D depicts a fourth surge signature profile that represents flow velocity oscillations over time during the deep surge mode.

FIGS. 4A-D represent surge signature profiles 120A-D according to an embodiment. The surge signature profiles 120A-D may be stored in the memory 118 and accessed by the processors 116 to determine if a surge condition is present. The surge signature profiles 120A-D may also be used by the processors 116 to identify the mode of surge. FIG. 4A depicts a first surge signature profile 120A that represents pressure oscillations over flow rate during a mild surge mode. FIG. 4B depicts a second surge signature profile 120B that represents pressure oscillations over flow rate during a deep surge mode. FIG. 4C depicts a third surge signature profile 120C that represents flow velocity oscillations over time during the mild surge mode. FIG. 4D depicts a fourth surge signature profile 120D that represents flow velocity oscillations over time during the deep surge mode. In an example, the controller 104 may compare the oscillations of the pressure measurements from the pressure sensor device 112 to the first and second surge signature profiles 120A, 120B. Additionally, or as an alternative, the controller 104 may compare the oscillations of the flow velocity values, derived from the pressure measurements, to the third and fourth surge signature profiles 120C, 120D. The controller 104 may determine whether a surge condition has a mild surge mode or a deep surge mode based on a comparison to the first and second surge signature profiles 120A, 120B and/or a comparison to the third and fourth surge signature profiles 120C, 120D.

The magnitude of pressure pulses in deep and mild surges might be similar, as shown in FIGS. 4A and 4B, although the oscillation frequency is different. The controller 104 may use the oscillation frequency to differentiate the two modes of surge. Existing systems that rely on static pressure sensing as feedback loop may not be able to detect modes of surge. The pressure plot in FIG. 4A shows that the mild surge cycle is limited to the positive flow region right of the Y-axis (e.g., the limit cycle area shown in FIG. 4A). The pressure plot in FIG. 4B shows that the deep surge cycle extends to the negative or reverse flow region left of the Y-axis. The pitot tube 110 may provide information on both static and dynamic pressures, which are processed to determine flow.

With respect to the flow plots in FIGS. 4C and 4D, the controller 104 may use properties such as the cycle period or interval, changes in the magnitude of the flow over time, and/or the presence or absence of flow direction changes to differentiate the mild surge mode shown in FIG. 4C from the deep surge mode shown in FIG. 4D. For example, the deep surge cycle may have a longer duration before repeating than the mild surge cycle. In addition, the deep surge mode may be characterized by a first portion of increasing flow magnitude between peaks and troughs over time followed by a second portion in which the flow direction reverses (e.g., flow reversal portion shown in FIG. 4D).

The controller 104 may be able to determine which portion of the flow circuit is experiencing a surge condition as well. For example, the flow circuit may include multiple valve assemblies 102 disposed at different locations. Referring back to FIG. 3, the controller 104 may receive pressure measurements from the first valve assembly (e.g., check valve) 306A that is located along the outlet duct 308 of the first compressor 302A, and may also receive pressure measurements from the second valve assembly (e.g., check valve 306B) located along the outlet duct 310 of the second compressor 302B. The controller 104 may independently perform the comparison procedure described above for each of the valve assemblies 306A, 306B. For example, the pressure measurements received by the controller 104 from the first valve assembly 306A may be tagged to indicate that the pressure sensor device 112 of the first valve assembly 306A is the source. Likewise, the pressure measurements received by the controller 104 from the second valve assembly 306B may be tagged to indicate the pressure sensor device 112 of the second valve assembly 306B is the source. In response to detecting a surge condition based on the pressure measurements from the first valve assembly 306A, the controller 104 can determine that the surge condition is located in the portion of the flow circuit 300 that includes the first compressor 302A and the first valve assembly 306A. If no surge condition is detected based on the pressure measurements from the second valve assembly 306B during the same time period, the controller 104 can deduce that the first compressor 302A may have an issue (e.g., may be unloaded), while the second compressor 302B is operating as designed.

In response to detecting any surge condition, the controller 104 may take one or more responsive actions. The responsive actions taken may depend on the mode of the surge condition detected and/or the portion(s) of the flow circuit experiencing the surge condition. In an example, the controller 104 may generate control signals to reconfigure compressor operation of at least one of the compressors 302 in an attempt to negate the surge and regain steady state flow. For example, assuming that the surge condition is detected based on the pressure measurements from the first valve assembly 306A in FIG. 3, the controller 104 may reconfigure compressor operation by increasing an operating speed of the first compressor 302A and/or changing an angle of attack of a diffuser vane on the first compressor 302A. If the surge condition is affecting both compressors 302A, 302B, the controller 104 may reconfigure the compressor operation of both compressors 302A, 302B. These mitigating actions may prevent a mild surge mode from transitioning to a more destructive deep surge mode.

In another example, the controller 104 may respond to detecting the surge condition by controlling the communication device 106 to communicate an alert message to a user to notify the user about the surge condition. The communication device 106 may transmit an alert message to a portable computing device (e.g., smartphone, tablet computer, smartwatch or other wearable device, etc.), a laptop or desktop computer, a workstation display device, or the like. Optionally, the controller 104 may respond to detecting the surge condition by automatically scheduling maintenance for the compressor or compressors 302 associated with the surge condition. The maintenance may be scheduled for a time in the future that the flow circuit 300 is not operational. The maintenance may be scheduled to repair or replace the compressor 302 that may have caused or have been damaged by the surge (before that compressor actually fails in operation and necessitates an unscheduled maintenance event).

In an embodiment, the controller 104 may track the number of surge conditions detected over time. For example, each time that a new surge condition or surge event is detected, the controller 104 may increase the count of detected surges (e.g., the surge count 122) in the memory 118 by one. Once to the running surge count 122 reaches a designated threshold number, the controller 104 may automatically schedule maintenance for the one or more compressors 302 or generate a message to instruct a user to schedule maintenance for the one or more compressors 302. The controller 104 may keep multiple different counts based on the different compressors 302, the mode of surge condition detected, the total surge conditions detected, and/or the like. For example, the surge count 122 may indicate that the first compressor 302A is associated with 24 total surge conditions, of which 18 are mild mode and 6 are deep mode. The designated threshold number may be set by a user or operator, an ANN algorithm, an external maintenance planning system, or the like. The controller 104 compares the surge count 122 to the threshold number. The controller 104 may take no action until the surge count 122 reaches the threshold number. There may be different designated threshold numbers for total surge conditions, mild mode surges, and deep mode surges. Upon reaching at least one of the designated threshold numbers, the controller 104 may schedule to repair or replace the compressor 302 for a time in the future that the flow circuit 300 is not operational (before that compressor actually fails in operation and necessitates an unscheduled maintenance event).

Figure 5:
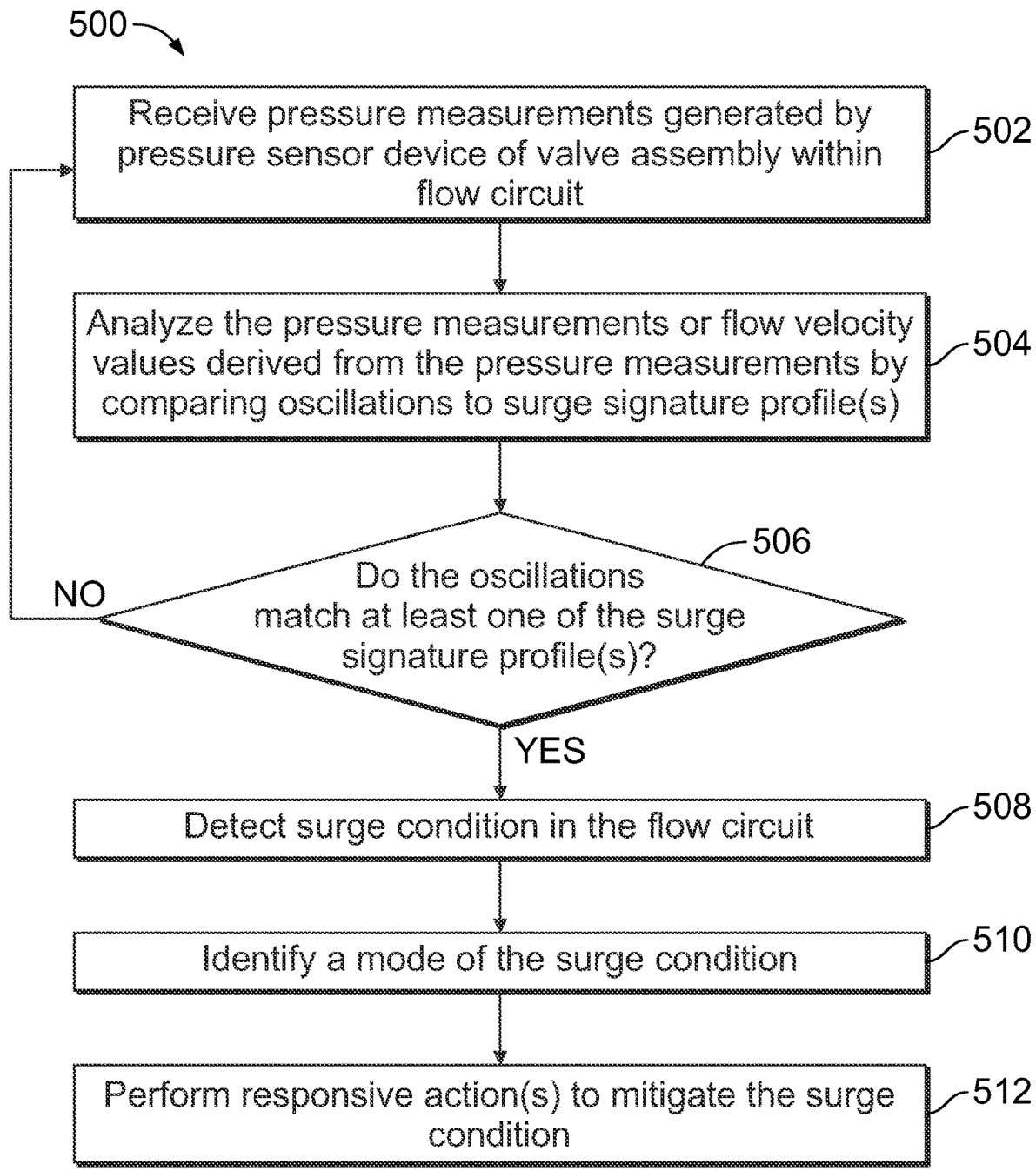
FIG. 5 is a flow chart of a method for detecting surge conditions in a flow circuit according to an embodiment.

FIG. 5 is a flow chart 500 of a method for detecting surge conditions in a flow circuit according to an embodiment. The method may be performed, at least in part, by the valve assembly 102 and the controller 104 of the surge control system 100 shown in FIG. 1. The method optionally may include at least one additional step than shown, at least one fewer step than shown, and/or at least one different step than shown in FIG. 5. The method may be performed to concurrently monitor multiple different portions of a flow circuit, such as multiple different portions downstream of different respective compressors. For example, the method may be used to monitor both compressors 302A, 302B of the fluid flow circuit 300 shown in FIG. 3.

At step 502, pressure measurements are received that are generated by a pressure sensor device 112 of a valve assembly 102 within a flow circuit 300. The valve assembly 102 may include a valve body 124 that obstructs a flow path through a conduit 308 and a pitot tube 110 integrated onto the valve body 124. The pressure sensor device 112 may be operably connected to the pitot tube 110. The pressure measurements may represent pressure in the pitot tube 110 over time.

At step 504, either the pressure measurements or flow velocity values derived from the pressure measurements are analyzed. The analysis may include comparing oscillations in the pressure measurements or oscillations in the flow velocity measurements to one or more surge signature profiles 120 stored in the memory 118.

At step 506, it is determined if the oscillations match at least one of the surge signature profiles 120. The match is achieved when the oscillations match at least one of the surge signature profiles 120 beyond a designated correspondence threshold. If no surge condition is detected, then the method returns to step 502 to continue receiving pressure measurements and monitoring.

If, on the other hand, the oscillations match at least one of the surge signature profiles 120 beyond the correspondence threshold, then flow continues to step 508 and a surge condition is detected in the flow circuit 300.

Optionally, at step 510, the method may include identifying that the surge condition is a first mode surge condition or a second mode surge condition based on the oscillations in the at least one of the pressure measurements or the flow velocity values.

At step 512, one or more responsive actions are performed in response to detecting the surge condition in order to mitigate the surge condition. The responsive actions that are taken may be specific to the identified surge mode and/or portion of the flow circuit 300 that experiences the surge condition. The responsive actions may include generating control signals, via the controller 104, to reconfigure compressor operation of at least a first compressor 302A of the flow circuit 300. The compressor operation may be reconfigured by increasing an operating speed of the first compressor 302A or changing an angle of attack of a diffuser vane on the first compressor 302A. Other responsive actions may include automatically scheduling maintenance for the first compressor 302A, communicating an alert message to user to notify the user about the surge condition, and/or increasing a surge count 122 in the memory 118.

Clause 1. A surge control system comprising:
  a valve assembly located along a fluid conduit downstream of one or more compressors in a flow circuit and configured to receive a fluid stream from the one or more compressors, wherein the valve assembly includes a valve body, a pitot tube integrated onto the valve body, and a pressure sensor device operably connected to the pitot tube; and
  a controller comprising one or more processors, the controller configured to receive pressure measurements generated by the pressure sensor device, wherein the pressure measurements represent pressure in the pitot tube over time, wherein the controller is configured to:
    analyze at least one of (i) the pressure measurements or (ii) flow velocity values derived from the pressure measurements; and
    detect a surge condition in the flow circuit based on oscillations in the at least one of the pressure measurements or the flow velocity values.

Clause 2. The surge control system of Clause 1, wherein, in response to detecting the surge condition, the controller is further configured to generate control signals to reconfigure compressor operation of at least a first compressor of the one or more compressors.

Clause 3. The surge control system of Clause 2, wherein the controller is configured to reconfigure compressor operation by one or both of increasing an operating speed of the first compressor or changing an angle of attack of a diffuser vane on the first compressor.

Clause 4. The surge control system of any of Clauses 1-3, wherein the controller is further configured to respond to detecting the surge condition by one or both of (i) controlling a communication device to communicate an alert message to a user to notify the user about the surge condition or (ii) automatically scheduling maintenance for at least a first compressor of the one or more compressors.

Clause 5. The surge control system of any of Clauses 1-4, wherein the controller is configured to analyze the at least one of the pressure measurements or the flow velocity values by comparing the oscillations to one or more surge signature profiles stored in a memory device, and wherein the controller is configured to detect the surge condition in response to the oscillations matching at least one of the one or more surge signature profiles beyond a designated correspondence threshold.

Clause 6. The surge control system of Clause 5, wherein the one or more surge signature profiles include a first mode signature profile and a second mode signature profile, and wherein the controller is further configured to identify that the surge condition is a first mode surge condition in response to the oscillations matching the first mode signature profile more than the second mode signature profile.

Clause 7. The surge control system of any of Clauses 1-6, wherein the valve body is a portion of a check valve that permits fluid flow through the valve assembly in only a downstream direction.

Clause 8. The surge control system of any of Clauses 1-7, wherein the valve body has a front side that faces upstream along the fluid conduit toward the one or more compressors, and a back side that faces downstream along the fluid conduit toward a load, and wherein the pitot tube is coupled to the back side of the valve body.

Clause 9. The surge control system of any of Clauses 1-8, wherein the valve body includes a hinge, a gate that rotates about the hinge, and a support structure, and wherein the pitot tube extends parallel to the hinge and is mounted to the support structure.

Clause 10. The surge control system of any of Clauses 1-9, wherein the pitot tube has a hollow body and multiple sensing holes through an outer surface of the hollow body, and wherein the sensing holes are spaced apart along a length of the pitot tube.

Clause 11. The surge control system of any of Clauses 1-10, wherein the controller is further configured to identify that the surge condition is a first mode surge condition or a second mode surge condition based on the oscillations.

Clause 12. The surge control system of any of Clauses 1-11, wherein the controller is further configured to increase a count of detected surges in a memory device based on the surge condition that is detected, and wherein the controller is further configured to one or more of generate a message to instruct a user to schedule maintenance for the one or more compressors or automatically schedule maintenance for the one or more compressors in response to the count reaching a designated threshold number.

Clause 13. A method for detecting surge conditions in a flow circuit, the method comprising:
    receiving pressure measurements generated by a pressure sensor device of a valve assembly within a flow circuit, wherein the valve assembly includes a valve body that obstructs a flow path through a conduit and a pitot tube integrated onto the valve body, and wherein the pressure sensor device is operably connected to the pitot tube and the pressure measurements represent pressure in the pitot tube over time;
    analyzing, via a controller comprising one or more processors, at least one of (i) the pressure measurements or (ii) flow velocity values derived from the pressure measurements; and
    detecting a surge condition in the flow circuit based on oscillations in the at least one of the pressure measurements or the flow velocity values.

Clause 14. The method of Clause 13, further comprising generating control signals, via the controller, to reconfigure compressor operation of at least a first compressor of the flow circuit in response to detecting the surge condition.

Clause 15. The method of Clause 14, wherein the control signals are generated to reconfigure compressor operation by one or both of increasing an operating speed of the first compressor or changing an angle of attack of a diffuser vane on the first compressor.

Clause 16. The method of any of Clauses 13-15, wherein said analyzing the at least one of the pressure measurements or the flow velocity values comprises comparing the oscillations to one or more surge signature profiles stored in a memory device, and wherein said detecting the surge condition comprises determining that the oscillations match at least one of the one or more surge signature profiles beyond a designated correspondence threshold.

Clause 17. The method of any of Clauses 13-16, further comprising identifying that the surge condition is a first mode surge condition or a second mode surge condition based on the oscillations in the at least one of the pressure measurements or the flow velocity values.

Clause 18. A valve assembly comprising:
    a valve body including a front side and a back side opposite the front side, wherein the valve body is configured to be installed in a fluid conduit such that the front side faces upstream and the back side faces downstream relative to a fluid flow direction;
    a pitot tube coupled to the back side of the valve body; and
    a pressure sensor device operably connected to the pitot tube and configured to generate pressure measurements representing pressure in the pitot tube over time.

Clause 19. The valve assembly of Clause 18, wherein the valve body includes a hinge, a gate that rotates about the hinge, and a support structure, and wherein the pitot tube extends parallel to the hinge and is mounted to the support structure.

Clause 20. The valve assembly of Clause 18 or Clause 19, wherein the pitot tube has a hollow body and multiple sensing holes through an outer surface of the hollow body, and wherein the sensing holes are spaced apart along a length of the pitot tube.

While various spatial and direction terms such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A surge control system comprising:
    a valve assembly located along a fluid conduit downstream of one or more compressors in a flow circuit and configured to receive a fluid stream from the one or more compressors, wherein the valve assembly includes a valve body, a pitot tube integrated onto the valve body, and a pressure sensor device operably connected to the pitot tube; and
    a controller comprising one or more processors, the controller configured to receive pressure measurements generated by the pressure sensor device, wherein the pressure measurements represent pressure in the pitot tube over time,
    wherein the controller is configured to:
        analyze at least one of (i) the pressure measurements or (ii) flow velocity values derived from the pressure measurements; and
        detect a surge condition in the flow circuit based on oscillations in the at least one of the pressure measurements or the flow velocity values.

2. The surge control system of claim 1, wherein, in response to detecting the surge condition, the controller is further configured to generate control signals to reconfigure compressor operation of at least a first compressor of the one or more compressors.

3. The surge control system of claim 2, wherein the controller is configured to reconfigure compressor operation by one or both of increasing an operating speed of the first compressor or changing an angle of attack of a diffuser vane on the first compressor.

4. The surge control system of claim 1, wherein the controller is further configured to respond to detecting the surge condition by one or both of (i) controlling a communication device to communicate an alert message to a user to notify the user about the surge condition or (ii) automatically scheduling maintenance for at least a first compressor of the one or more compressors.

5. The surge control system of claim 1, wherein the controller is configured to analyze the at least one of the pressure measurements or the flow velocity values by comparing the oscillations to one or more surge signature profiles stored in a memory device, and wherein the controller is configured to detect the surge condition in response to the oscillations matching at least one of the one or more surge signature profiles beyond a designated correspondence threshold.

6. The surge control system of claim 5, wherein the one or more surge signature profiles include a first mode signature profile and a second mode signature profile, and wherein the controller is further configured to identify that the surge condition is a first mode surge condition in response to the oscillations matching the first mode signature profile more than the second mode signature profile.

7. The surge control system of claim 1, wherein the valve body is a portion of a check valve that permits fluid flow through the valve assembly in only a downstream direction.

8. The surge control system of claim 1, wherein the valve body has a front side that faces upstream along the fluid conduit toward the one or more compressors, and a back side that faces downstream along the fluid conduit toward a load, and wherein the pitot tube is coupled to the back side of the valve body.

9. The surge control system of claim 1, wherein the valve body includes a hinge, a gate that rotates about the hinge, and a support structure, and wherein the pitot tube extends parallel to the hinge and is mounted to the support structure.

10. The surge control system of claim 1, wherein the pitot tube has a hollow body and multiple sensing holes through an outer surface of the hollow body, and wherein the sensing holes are spaced apart along a length of the pitot tube.

11. The surge control system of claim 1, wherein the controller is further configured to identify that the surge condition is a first mode surge condition or a second mode surge condition based on the oscillations.

12. The surge control system of claim 1, wherein the controller is further configured to increase a count of detected surges in a memory device based on the surge condition that is detected, and wherein the controller is further configured to one or more of generate a message to instruct a user to schedule maintenance for the one or more compressors or automatically schedule maintenance for the one or more compressors in response to the count reaching a designated threshold number.

13. A method for detecting surge conditions in a flow circuit, the method comprising:
receiving pressure measurements generated by a pressure sensor device of a valve assembly within a flow circuit, wherein the valve assembly includes a valve body that obstructs a flow path through a conduit and a pitot tube integrated onto the valve body, and wherein the pressure sensor device is operably connected to the pitot tube and the pressure measurements represent pressure in the pitot tube over time;
analyzing, via a controller comprising one or more processors, at least one of (i) the pressure measurements or (ii) flow velocity values derived from the pressure measurements; and
detecting a surge condition in the flow circuit based on oscillations in the at least one of the pressure measurements or the flow velocity values.

14. The method of claim 13, further comprising generating control signals, via the controller, to reconfigure compressor operation of at least a first compressor of the flow circuit in response to detecting the surge condition.

15. The method of claim 14, wherein the control signals are generated to reconfigure compressor operation by one or both of increasing an operating speed of the first compressor or changing an angle of attack of a diffuser vane on the first compressor.

16. The method of claim 13, wherein said analyzing the at least one of the pressure measurements or the flow velocity values comprises comparing the oscillations to one or more surge signature profiles stored in a memory device, and wherein said detecting the surge condition comprises determining that the oscillations match at least one of the one or more surge signature profiles beyond a designated correspondence threshold.

17. The method of claim 13, further comprising identifying that the surge condition is a first mode surge condition or a second mode surge condition based on the oscillations in the at least one of the pressure measurements or the flow velocity values.

18. A valve assembly comprising:
a valve body including a front side and a back side opposite the front side, wherein the valve body is configured to be installed in a fluid conduit such that the front side faces upstream and the back side faces downstream relative to a fluid flow direction;
a pitot tube coupled to the back side of the valve body; and
a pressure sensor device operably connected to the pitot tube and configured to generate pressure measurements representing pressure in the pitot tube over time.

19. The valve assembly of claim 18, wherein the valve body includes a hinge, a gate that rotates about the hinge, and a support structure, and wherein the pitot tube extends parallel to the hinge and is mounted to the support structure.

20. The valve assembly of claim 18, wherein the pitot tube has a hollow body and multiple sensing holes through an outer surface of the hollow body, and wherein the sensing holes are spaced apart along a length of the pitot tube.

* * * * *